United States Patent
Jang et al.

(10) Patent No.: US 9,002,423 B2
(45) Date of Patent: Apr. 7, 2015

(54) SUPERCONDUCTING CABLE

(71) Applicant: LS Cable Ltd., Anyang-si (KR)

(72) Inventors: Hyun Man Jang, Hwaseong-si (KR); Su Kil Lee, Gumi-si (KR); Young Woong Kim, Suwon-si (KR); Cheol Hwi Ryu, Ansan-si (KR)

(73) Assignee: LS Cable Ltd., Anyang-si (KR)

( * ) Notice: Subject to any disclaimer, the term of this patent is extended or adjusted under 35 U.S.C. 154(b) by 188 days.

(21) Appl. No.: 13/658,092

(22) Filed: Oct. 23, 2012

(65) Prior Publication Data

US 2013/0165324 A1    Jun. 27, 2013

(30) Foreign Application Priority Data

Dec. 23, 2011   (KR) ......................... 10-2011-0141027

(51) Int. Cl.
*H01F 6/06* (2006.01)
*H01B 12/06* (2006.01)
*H01B 12/16* (2006.01)

(52) U.S. Cl.
CPC .............. *H01B 12/06* (2013.01); *H01B 12/16* (2013.01); *Y02E 40/642* (2013.01); *Y02E 40/647* (2013.01)

(58) Field of Classification Search
CPC ................. H01B 12/16; H01B 16/06
See application file for complete search history.

(56) References Cited

U.S. PATENT DOCUMENTS

| | | | |
|---|---|---|---|
| 2010/0126748 A1* | 5/2010 | Traeholt et al. | 174/15.5 |
| 2010/0227764 A1* | 9/2010 | Willen et al. | 505/163 |
| 2011/0207611 A1 | 8/2011 | Jang et al. | |
| 2011/0275521 A1* | 11/2011 | Stemmle et al. | 505/163 |
| 2012/0252677 A1* | 10/2012 | Soika et al. | 505/163 |
| 2014/0051581 A1* | 2/2014 | Stemmle et al. | 505/163 |

FOREIGN PATENT DOCUMENTS

| | | |
|---|---|---|
| CN | 101164120 A | 4/2008 |
| CN | 101361143 A | 2/2009 |
| CN | 102163477 A | 8/2011 |
| KR | 10-2008-0000671 | 1/2008 |
| KR | 10-2011-091929 | 8/2011 |
| WO | WO 2006/111170 A2 | 10/2006 |
| WO | WO 2007/083873 A1 | 7/2007 |

* cited by examiner

*Primary Examiner* — Colleen Dunn
(74) *Attorney, Agent, or Firm* — NSIP Law

(57) ABSTRACT

A superconducting cable is provided. The superconducting cable includes a core part including a former disposed at the center of the core part, one or more superconducting conductive layers with each electric phase disposed at the outside of the former in a radial directions, a insulating layer disposed at the outside of each the conductive layer in a radial direction and a shielding layer disposed at the outermost of the insulating layer; and a cryostat disposed at the outside of the core part in a radial direction with first space being interposed therebetween, having a vacuum part disposed therein and electrically wired to neutral pole (N pole).

9 Claims, 5 Drawing Sheets

FIG. 4

< STRAY VOLTAGE OF AN ALUMINUM CRYOSTAT >

$$\vec{v}_a \propto \frac{1}{r_{as}^2} \cdot j_{PhaseA}$$

$$\vec{v}_b \propto \frac{1}{r_{bs}^2} \cdot j_{PhaseB}$$

$$\vec{v}_c \propto \frac{1}{r_{cs}^2} \cdot j_{PhaseC}$$

$$\vec{v}_{Al\_Cryostat} = \vec{v}_a + \vec{v}_b + \vec{v}_c \approx 0$$

$$\vec{I}_{Al\_Cryostat} = \vec{v}_{Al\_Cryostat} / Z_{Al\_Cryostat} \approx 0$$

SUPERCONDUCTING CABLE

CROSS-REFERENCE TO RELATED APPLICATION

This application claims priority to Korean Patent Application No. 10-2011-0141027, filed on Dec. 23, 2011, and all the benefits accruing therefrom under 35 U.S.C. §119, the contents of which in its entirety are herein incorporated by reference.

BACKGROUND

1. Field

The present disclosure relates to a superconducting cable, and more particularly a superconducting cable in which superconducting conductors with each phase are coaxially disposed trebly to configure a core, and an outer cryostat is configured with an aluminum tube having high conductivity to be used as a neutral line.

2. Description of the Related Art

A superconducting cable may transmit a large amount of power in comparison to a general normal conduction cable by using a superconducting wire as a conductor.

For example, Korean Patent Publication No. 10-2011-0091929 discloses a superconducting cable which may be a one phase superconducting cable having a single core and a multi-phase superconducting cable in which several cores with each different electric phases are tied into a single one, or the like, and the multi-phase superconducting cable particularly includes a three phase (A-B-C phase or R-S-T phase) superconducting cable having three cores.

FIG. 1 is a schematic cross-sectional view showing a general three phase superconducting cable.

Referring to FIG. 1, three cores 20 configuring phases (namely, A phase, B phase and C phase) in a cryostat 10 are disposed at three phase superconducting cable 2. In addition, a fluid for maintaining a superconductor in an extremely low temperature state flows in a space 20a between the cryostat 10 and the three cores 20. The three cores 20 are twisted to form a single integrated axis or common axis. The core 20 having such an integrated or common axis shape is commonly called 'Co-axial' cable (in this specification, it is called 'three-core integrated cable' (three co-axial cable cores in one cryostat)).

In the three-core integrated superconducting cable 2, the cryostat 10 includes an inner cryostat 11 made of a metallic tube, an adiabatic layer 12 made of multi-layered adiabatic materials, and an outer cryostat 13 keeping a vacuum part 10a by a spacer 15, in order from the inner side to the outer side in a radial direction.

In addition, the superconducting cable core 20 of each phase includes a former 21 having a solid shape or a hollow shape forming a coolant channel therein, a superconducting conductive layer 22, an insulating layer 23 and a superconducting shielding layer 24, in order from the center to the outer side in the radial direction.

As described above, the three-core integrated superconducting cable 2 should have the superconducting conductive layer 22 and the superconducting shielding layer 24 for each of three cores 20 with each phase. Since the superconducting wire occupies 90% of the production cost of a superconducting cable, if the superconducting conductive layer 22 and the superconducting shielding layer 24 of the three-core integrated superconducting cable 2 are made of superconducting wires, a large amount of superconducting wires is required, which deteriorates the competitiveness of the product. In addition, since three cores 20 with each phase are arranged in a triangular pattern in a sectional view, the diameter of the entire cable is great, which increases the construction costs for installing the superconducting cable.

In addition, the three-core integrated superconducting cable is short-circuited from the superconducting shielding layer 24 in a terminal connection box and thus plays a role of a neutral line at ordinary time. Moreover, the three-core integrated superconducting cable should be configured to flow a fault current to the superconducting shielding layer 24 during a short time before a circuit breaker or the like operates when a fault such as earth or phase short occurs in a power system. However, the superconducting shielding layer 24 may not bear an abrupt current increase when a fault current is generated since it is made of a thin-film wire with a small sectional area. Therefore, a copper conductive layer is further provided to be used as a neutral line together with the superconducting shielding layer. As described above, since a copper conductor neutral line should be stranded around each of the cores 20 with three phases, the three-core integrated superconducting cable has a complex structure, a complicated manufacturing process and a high production cost.

Meanwhile, Korean Patent Publication No. 10-2008-0000671 discloses a cable (AC cable), which is also called 'triaxial cable', in which superconducting conductors with each phase are disposed to coaxially overlap in addition to the three-core integrated superconducting cable where cores with each phase are cooperatively stranded. In this specification, the superconducting cable is called 'triaxial cable'.

The triaxial superconducting cable disclosed in KR 10-2008-0000671 is configured so that a single core having superconducting conductive layers (power transmission layers) with different phases, which coaxially overlap trebly with the insulating layers being interposed between them, is disposed from the innermost former to the outside in the radial direction. This cable may decrease the diameter of the core, and so the diameter of the entire cable is somewhat reduced in comparison to the three-phase integrated superconducting cable. However, since a neutral line (neutral layer) made of normal conduction metal should be stranded on the outer circumference of the outer insulating layer of the core in order to cope with zero phase current (less than several hundred amperes) and fault current generated by three-phase unbalanced current at ordinary time, the structure and manufacturing process of the triaxial cable are also complicated, and a high production cost is required.

In particular, in a case where a neutral line is disposed at the outside of the core, the neutral line generates heat since zero phase current flows through the neutral line, and the capacity of a cooling device for cooling the heat increases, which also increases the entire system cost. In addition, if fault current of several ten kilo amperes flows into the cable, an electromagnetic force is generated at the neutral line by the fault current, and the electromagnetic force damages the insulating body, thereby deteriorating the reliability of the superconducting cable.

SUMMARY

The present disclosure is directed to solving the problem of an existing superconducting cable and providing a superconducting cable and a triaxial superconducting cable, in which superconducting conductors with each phases coaxially overlap to configure a core and an outer cryostat is configured with an aluminum tube having high conductivity to be used as a neutral line which is a fault current pass circuit, without forming a neutral line on the outer circumference of the core, so that the superconducting cable is manufactured with a low production cost due to a small diameter and a simple structure and also the reliability of the cable is improved by preventing overheating or damage of an insulating body due to the electromagnetic force generated at the neutral line.

In one aspect, there is provided a superconducting cable, which comprises: a core part including a former disposed at the center of the core part, one or more superconducting conductive layers with each electric phase disposed at the outside of the former in a radial directions, a insulating layer disposed at the outside of each the conductive layer in a radial direction and a shielding layer disposed at the outermost of the insulating layer; and a cryostat disposed at the outside of the core part in a radial direction with first space being interposed therebetween, having a vacuum part disposed therein and electrically wired to neutral pole (N pole).

In the superconducting cable according to the present disclosure, the cryostat comprises an inner cryostat disposed at the inside in the radial direction and an outer cryostat disposed at the outside in radial direction with the vacuum part disposed therebetween, and the outer cryostat is electrically wired to the neutral pole (N pole).

The inner cryostat may be wired to electrically earth at the superconducting cable system.

An adiabatic material may be disposed at the outer circumference of the inner cryostat, and the adiabatic material and the outer cryostat maintain a gap by a spacer to form the vacuum part.

The former may be configured to have a hollow forming a second space or is configured in a solid form.

A coolant may flow in at least one of the first space and the second space.

The core part may comprise three conductive layers to provide a triaxial superconducting cable.

The cryostat may be made of aluminum material.

In another aspect, there is provided a triaxial superconducting cable, which comprises: a cryostat having an inner cryostat and an outer cryostat coaxially disposed with a vacuum part being interposed therebetween; and a single core disposed in the inner cryostat of the cryostat with a space being interposed therebetween, wherein a former is disposed at the center of the core, superconducting conductive layers with each electric phase are coaxially disposed at the outer circumference of the former at an outer side in a radial direction with insulating layers being interposed therebetween, and the insulating layer are coaxially disposed at the outer circumference of an outermost superconducting conductive layer, and wherein the outer cryostat of the cryostat is made of aluminum material and configures a neutral line electrically wired to neutral pole (N pole) at a superconducting cable system.

Furthermore, there is also provided a triaxial superconducting cable, which comprises: a cryostat having an inner cryostat and an outer cryostat coaxially disposed with a vacuum part being interposed therebetween; and a single core disposed in the inner cryostat of the cryostat with a space being interposed therebetween, wherein the core includes a former, which is disposed at a center thereof, and includes a first phase superconducting conductive layer, a first insulating layer, a second phase superconducting conductive layer, a second insulating layer, a third phase superconducting conductive layer, a third insulating layer and a binder, which coaxially overlap in order from the former to an outside in a radial direction, and wherein the outer cryostat of the cryostat is made of aluminum material and configures a neutral line electrically wired to neutral pole (N pole) at a superconducting cable system.

If the triaxial superconducting cable according to the present disclosure is used, the size of the superconducting cable may be reduced since superconducting conductors with each phase coaxially overlap to reduce a sectional size of the cable.

In addition, if the triaxial superconducting cable according to the present disclosure is used, an amount of superconducting wire used may be greatly reduced, which ensures excellent economic property, since a superconducting shielding layer is not necessary.

In addition, if the triaxial superconducting cable according to the present disclosure is used, since an outer cryostat which must be adopted in the superconducting cable is made of aluminum material with excellent conductivity and the outer cryostat is wired to neutral pole to serve as a neutral line, it is not needed to separately strand a neutral line conductor such as a copper conductor on the insulating layer at the outer circumference of the core. Therefore, the cable may have a simple structure and ensure easy manufacture, and it is possible to prevent the insulating body from being damaged by fault current, thereby improving the reliability of the superconducting cable.

In addition, if the triaxial superconducting cable according to the present disclosure is used, even when the outer cryostat generates heat due to the inflow of unbalanced current or fault current, since adiabatic material is interposed between the outer cryostat and the space, the heat of the outer cryostat does not influence inner insulation and inner coolant, and accordingly it is possible to implement a system which may have excellent efficiency and solve a heating problem of the coolant when zero phase current or fault current flows in.

BRIEF DESCRIPTION OF THE DRAWINGS

The above and other aspects, features and advantages of the disclosed exemplary embodiments will be more apparent from the following detailed description taken in conjunction with the accompanying drawings in which:

FIG. 4 is a schematic diagram for illustrating the stray voltage of an aluminum cryostat which is a neutral line of the triaxial superconducting cable according to the present disclosure.

DETAILED DESCRIPTION

Hereinafter, a preferred embodiment of the present disclosure will be described with reference to the accompanying drawings.

Figure 1:
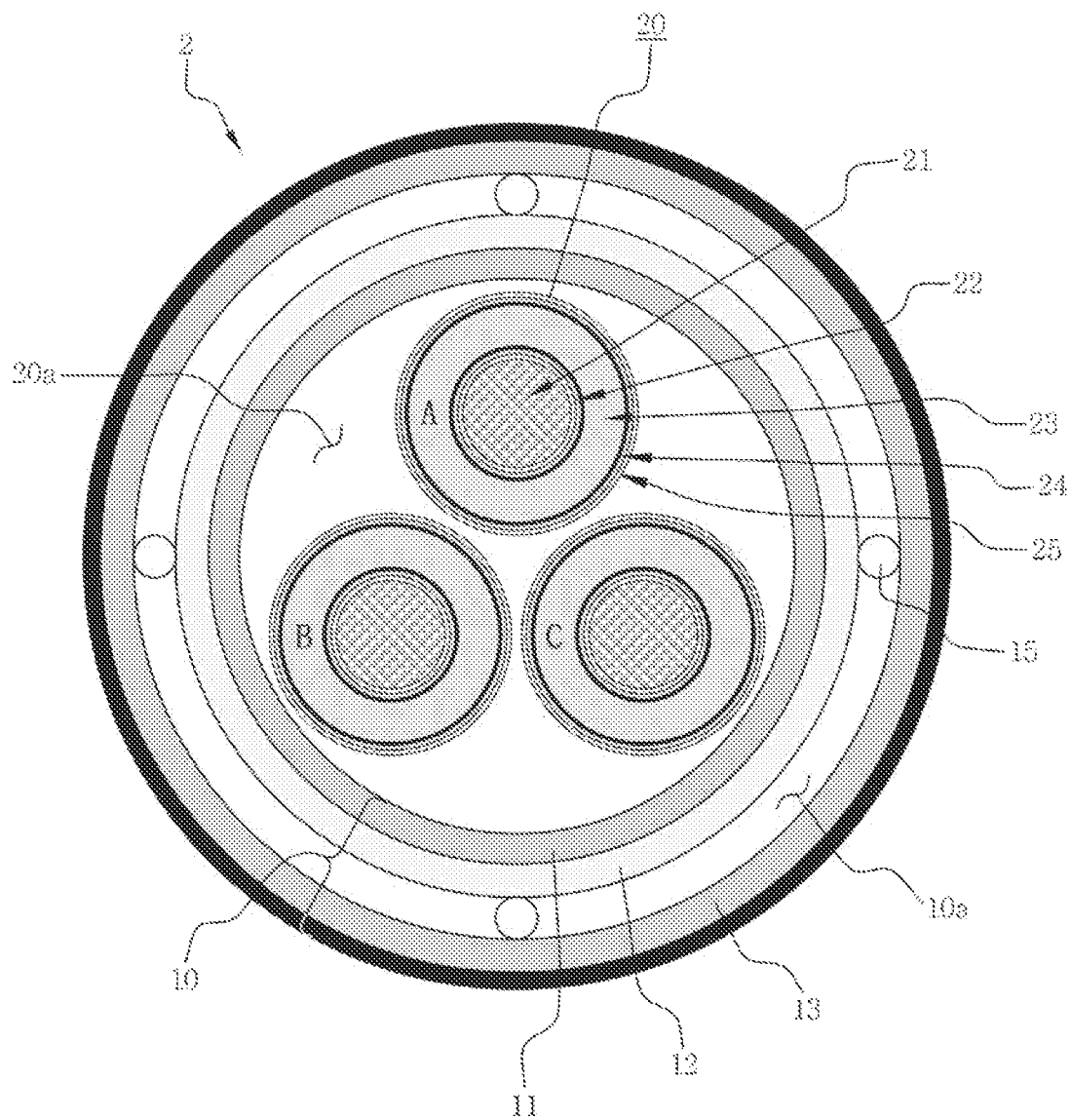
FIG. 1 is a sectional view showing a general three-core integrated superconducting cable.
Figure 2:
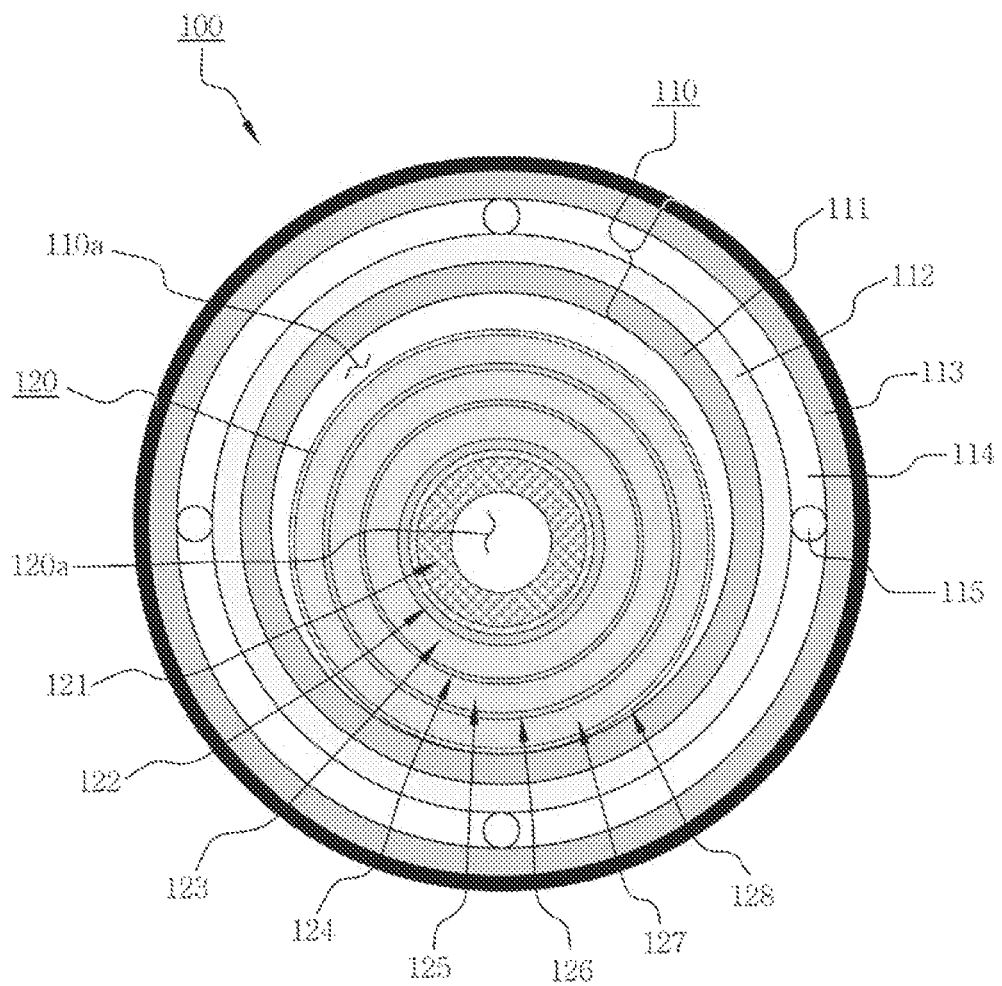
FIG. 2 is a sectional view showing a triaxial superconducting cable according to the present disclosure.
Figure 3:
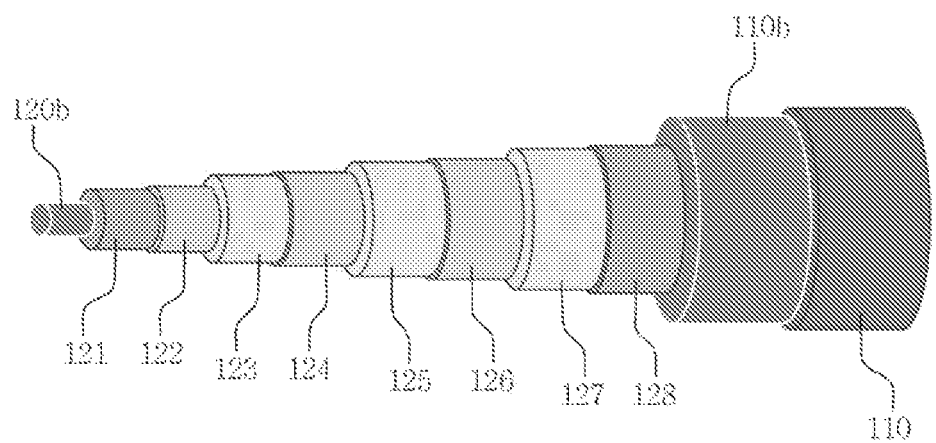
FIG. 3 is an equivalent circuit view of the superconducting cable shown in FIG. 2.

FIGS. 2 and 3 show the structure of a triaxial superconducting cable according to the present disclosure.

Referring to FIGS. 2 and 3, the triaxial superconducting cable 100 according to the present disclosure is configured to have a core 120 (hereafter, also referred as 'core part') in which superconducting conductors with each electric phase coaxially overlap in a cryostat 110. In FIG. 2, the center of the core 120 is dislocated from the center of the cryostat 110 (falling downwards), but it is a figure showing a sectional view of an elongated cable at any point and just intactly expresses that the core 120 goes down due to the gravity (located at that point). According to the installation method or the curve of the cable, the core 120 may droop down in the cryostat 110 or float in the middle at another point.

This will be described below in more detail.

The triaxial superconducting cable 100 maintains a space in the cryostat 110 so that the core 120 is disposed therein.

The core 120 includes a former 121 at a center thereof, and superconducting conductive layers with each phase are coaxially disposed at the outer circumference of the former 121 at an outer side in a radial direction with insulating layers being interposed between the superconducting conductive layers.

In the embodiment shown in FIGS. 2 and 3, the core 120 includes a first phase (for example; A phase) superconducting conductive layer 122, a first insulating layer 123, a second phase (for example; B phase) superconducting conductive layer 124, a second insulating layer 125, a third phase (for example; C phase) superconducting conductive layer 126, and a third insulating layer 127, which coaxially overlap in order from the former 121 at the center to an outer side in the radial direction. The outside of the third insulating layer 127 which is an outermost insulating layer is surrounded by a binder 128 (hereafter, also referred as 'shielding layer'). The binder 128 protects the outermost insulating layer and electrically earth, and the binder 128 is made of 'metal binder' which is generally configured with a metallic tape.

The first, second and third insulating layers 123, 125, 127 are composed of a semi-conductive layer, an insulating layer and a semi-conductive layer, though not distinguishably shown in the figures.

As shown in FIGS. 2 and 3, the former 121 is configured in a way that a metallic wire (for example, a copper wire) is stranded to have a hollow forming a space 120a at the center portion or stranded in a solid form where the inside is full without a space.

In addition, the former 121 may be configured with a metallic pipe having the space 120a therein. The space 120a (hereafter, also referred as 'second space') formed at the center of the former 121 is used as a passage for flowing a coolant 120b (see FIG. 3), and the space may also be maintained intactly even when a coolant does not flow therein.

The cryostat 110 is coaxial with the core 120 and plays a role of protecting the superconducting cable, namely the core 120, and maintaining the superconducting cable in an extremely low temperature state.

For this purpose, the cryostat 110 includes an inner cryostat 111 separated from the core 120 in the radial direction to form a space 110a (hereafter, also referred as 'first space'), and an outer cryostat 113 disposed to maintain a vacuum part 114 from the inner cryostat 111.

An adiabatic material 112 is disposed at the outer circumference of the inner cryostat 111 to shield heat. The inner cryostat 111 and the outer cryostat 113 maintain a gap by the spacer 115. In other words, in a case where the adiabatic layer 112 is formed at the inner cryostat 111, the spacer 115 is disposed between the adiabatic material 112 and the outer cryostat 113.

A coolant 110b (see FIG. 3) may flow in the space 110a between the inner cryostat 111 and the core 120 in order to assist cooling.

The inner cryostat 111 and the outer cryostat 113 are made of a corrugated pipe spirally corrugated.

In the present disclosure, the outer cryostat 113 is particularly made of an aluminum (Al) tube with excellent conductivity and is electrically wired as a neutral line (N pole) (neutral conductor) at a superconducting cable system.

Along with it, the inner cryostat 111 may be also made of an aluminum tube, and the inner cryostat 111 is wired to electrically earth.

In the superconducting cable system, since the inner cryostat 111 directly contacts extremely low temperature fluid (for example, liquid nitrogen) at a terminal and connection box, the inner cryostat 111 is not used as a neutral line but used as an earth line, and the outer cryostat 113 in a normal temperature state is used as a neutral line at ordinary time and configured as a fault current pass circuit when a fault occurs, instead of the inner cryostat 111. In a case where an earth wire is provided separately, the inner cryostat 111 may be made of a stainless steel tube which is frequently used for extreme low temperature.

In the superconducting cable of the present disclosure, if electric current is applied to the superconducting layer of each phase, voltage is induced to the outer cryostat 113 made of aluminum due to the influence of a magnetic field generated by the current, and a circulating current (shield current) flows in the outer cryostat 113 made of aluminum due to the corresponding stray voltage.

However, in a case where superconducting conductors with three phases are disposed to coaxially overlap as in the present disclosure, as shown in FIG. 4, electric current does not flow in the outer cryostat 113 made of aluminum. In FIG. 4, 'r' represents the distance from the conductor to the outer cryostat 113.

Since the triaxial superconducting cable 100 according to the present disclosure is configured so that superconducting conductors with each phase coaxially overlap, its sectional size may be reduced in comparison to an existing three-core integrated superconducting cable 2.

Figure 5:
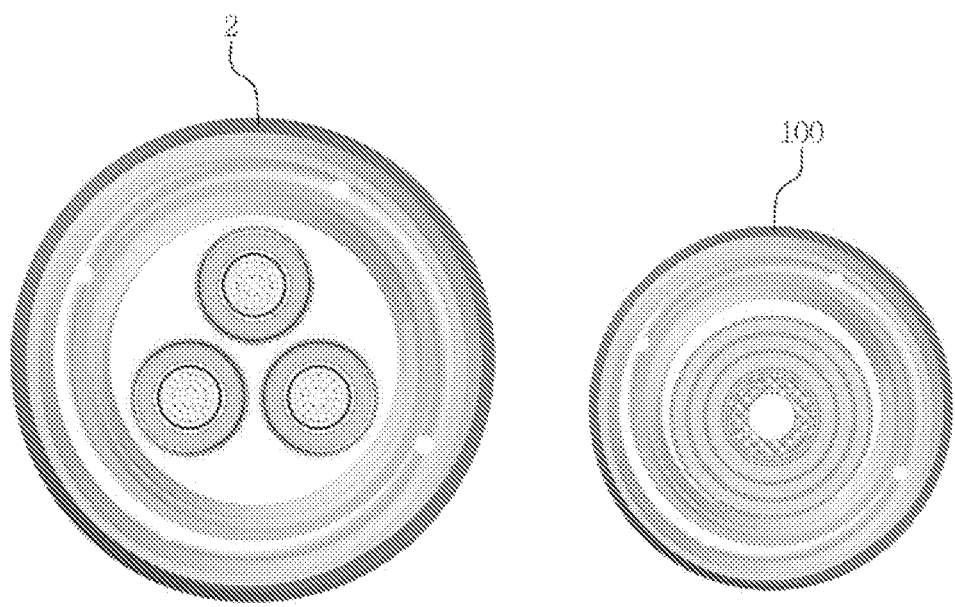
FIG. 5 is a schematic diagram for comparing sectional sizes of the triaxial superconducting cable according to the present disclosure and a general integrated superconducting cable.

FIG. 5 is a diagram for comparing actual sectional sizes of an existing three-core integrated superconducting cable 2 and the triaxial superconducting cable 100 according to the present disclosure, which have the same capacity, and it is possible to judge how much the superconducting cable according to the present disclosure may reduce its size.

In addition, since the existing three-core integrated superconducting cable 2 should further include a superconducting shielding layer 24 for the core with each phase, a large amount of superconducting wire is required. However, the superconducting cable 100 of the present disclosure does not need a superconducting shielding layer, and so an amount of superconducting wire used may be reduced by half in comparison to the three-core integrated superconducting cable 2, thereby ensuring excellent economic property.

In the existing three-core integrated superconducting cable, a copper conductor should be wound around the outer circumference of the core with each phase to play a role of a neutral line and a role of a fault current pass circuit. Similarly, in a case of an existing coaxial superconducting cable, a neutral line conductor such as a copper conductor should be wound around an outermost insulating layer. In the existing superconducting cable, since the cryostat is made of a stainless steel tube generally used for extremely low temperature, it is impossible to use the cryostat as a conductor. For this reason, it is not impossible to use the cryostat as an ordinary neutral line or a fault current pass circuit, and so a neutral line conductor should be separately stranded on each core. The existing cable where a neutral line conductor should be stranded on each core has a complex structure, and its manufacturing process is also complicated and difficult.

In addition, in a case where a neutral line conductor made of a normal conduction metal such as copper is stranded on the outside of the insulating layer, similar to both of the existing cables described above, if a fault current of several ten kA flows in the cable, an electromagnetic force is generated at the neutral line by the fault current, which may damage the insulating body.

However, in a case of the triaxial superconducting cable 100 of the present disclosure, since the outer cryostat 110 essentially required for the superconducting cable is made of aluminum material with excellent conductivity and is wired to neutral pole to serve as a neutral line, it is not needed to separately strand a neutral line conductor on the outermost insulating layer 127 of the core 120. Therefore, the cable may have a simple structure and be manufactured easily, and it is possible to prevent the insulating body from being damaged by a fault current, which improves the reliability of the superconducting cable.

Meanwhile, in a case of a three-phase power transmission cable, for example, power imbalance may occur among phases (A phase, B phase and C phase) due to the variation of a load at a power receiving party. Since the zero phase current flows along the neutral line as much as the imbalance (the difference in power), Joule heat is generated at the neutral line. In addition, when fault current flows in, the neutral line generates more heat.

However, in a case of an existing three-core integrated superconducting cable where the neutral line conductor 25 is stranded on the outer circumference of the core 20 with each phase, or in a case of an early coaxial superconducting cable where a neutral line conductor is stranded on the outermost portion of the core 120, the neutral line conductor contacts or is directly adjacent to a coolant (for example; liquid nitrogen (LN2)). Therefore, if heat is generated at the neutral line conductor by the unbalanced current or fault current, the coolant (extremely low temperature fluid) is heated, thereby deteriorating power transmission efficiency. In addition, in order to prepare the heating of the coolant, the superconducting cable system has a burden of further cooling the coolant.

However, if the outer cryostat 113 of the cryostat 110 is set as the neutral line instead of the inner cryostat 111 directly contacting the coolant as in the preferred embodiment of the superconducting cable according to the present disclosure, even when the outer cryostat 113 generates heat due to the introduction of unbalanced current or fault current, since the adiabatic material 112 is interposed between the outer cryostat 113 and the space 110a, the heat of the outer cryostat 113 does not influence the coolant in the space 110a.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A superconducting cable, comprising:
a core part including a former disposed at the center of the core part, one or more superconducting conductive layers with each electric phase disposed at the outside of the former in a radial directions, a insulating layer disposed at the outside of each the conductive layer in a radial direction and a shielding layer disposed at the outermost of the insulating layer; and
a cryostat disposed at the outside of the core part in a radial direction with first space being interposed therebetween, having a vacuum part disposed therein and electrically wired to neutral pole (N pole),
wherein the cryostat comprises an inner cryostat disposed at the inside in the radial direction and an outer cryostat disposed at the outside in radial direction with the vacuum part disposed therebetween, and
the outer cryostat is electrically wired to the neutral pole (N pole) and is made of aluminum (Al) material.

2. The superconducting cable according to claim 1, wherein the inner cryostat is wired to electrically earth at the superconducting cable system.

3. The superconducting cable according to claim 1, wherein an adiabatic material is disposed at the outer circumference of the inner cryostat, and the adiabatic material and the outer cryostat maintain a gap by a spacer to form the vacuum part.

4. The superconducting cable according to claim 1, wherein the former is configured to have a hollow forming a second space or is configured in a solid form.

5. The superconducting cable according to claim 4, wherein a coolant flows in at least one of the first space and the second space.

6. The superconducting cable according to claim 1, wherein the core part comprises three conductive layers to provide a triaxial superconducting cable.

7. The superconducting cable according to claim 1, wherein the inner cryostat is made of aluminum material.

8. A triaxial superconducting cable, comprising:
a cryostat having an inner cryostat and an outer cryostat coaxially disposed with a vacuum part being interposed therebetween; and
a single core disposed in the inner cryostat of the cryostat with a space being interposed therebetween,
wherein a former is disposed at the center of the core, superconducting conductive layers with each electric phase are coaxially disposed at the outer circumference of the former at an outer side in a radial direction with insulating layers being interposed therebetween, and the insulating layer are coaxially disposed at the outer circumference of an outermost superconducting conductive layer, and
wherein the outer cryostat of the cryostat is made of aluminum material and configures a neutral line electrically wired to neutral pole (N pole) at a superconducting cable system.

9. A triaxial superconducting cable, comprising:
a cryostat having an inner cryostat and an outer cryostat coaxially disposed with a vacuum part being interposed therebetween; and
a single core disposed in the inner cryostat of the cryostat with a space being interposed therebetween,
wherein the core includes a former, which is disposed at a center thereof, and includes a first phase superconducting conductive layer, a first insulating layer, a second phase superconducting conductive layer, a second insulating layer, a third phase superconducting conductive layer, a third insulating layer and a binder, which coaxially overlap in order from the former to an outside in a radial direction, and
wherein the outer cryostat of the cryostat is made of aluminum material and configures a neutral line electrically wired to neutral pole (N pole) at a superconducting cable system.

* * * * *